US009473546B2

(12) United States Patent
Shah et al.

(10) Patent No.: US 9,473,546 B2
(45) Date of Patent: Oct. 18, 2016

(54) REDUCING REAL TIME MEDIA TRAFFIC IN A NETWORK ENVIRONMENT

(71) Applicant: CISCO TECHNOLOGY, INC., San Jose, CA (US)

(72) Inventors: Sandipkumar V. Shah, Sunnyvale, CA (US); Charles U. Eckel, Los Altos, CA (US); Anindya Sinha, Union City, CA (US); Ramakrishna V. Goda, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 740 days.

(21) Appl. No.: 13/868,740

(22) Filed: Apr. 23, 2013

(65) Prior Publication Data

US 2014/0317183 A1 Oct. 23, 2014

(51) Int. Cl.
*G06F 15/16* (2006.01)
*H04L 29/06* (2006.01)

(52) U.S. Cl.
CPC ......... *H04L 65/403* (2013.01); *H04L 65/1006* (2013.01); *H04L 65/1083* (2013.01); *H04L 65/4038* (2013.01); *H04L 65/80* (2013.01)

(58) Field of Classification Search
None
See application file for complete search history.

(56) References Cited

U.S. PATENT DOCUMENTS

| 6,564,261 | B1 * | 5/2003 | Gudjonsson | H04L 12/1818 709/227 |
| 6,975,592 | B1 | 12/2005 | Seddigh et al. | |
| 8,111,629 | B2 | 2/2012 | Oron | |
| 2004/0181577 | A1 * | 9/2004 | Skurikhin | G06Q 10/10 709/204 |
| 2005/0141542 | A1 * | 6/2005 | Handekyn | H04N 21/4383 370/437 |
| 2005/0144321 | A1 * | 6/2005 | Forsberg | H04L 29/06027 709/245 |
| 2013/0279576 | A1 * | 10/2013 | Chen | H04N 19/00684 375/240.12 |

* cited by examiner

*Primary Examiner* — Jeffrey R Swearingen
(74) *Attorney, Agent, or Firm* — Patent Capital Group (57) ABSTRACT

An example method for reducing real time media traffic in a network environment is provided and includes examining a plurality of first requests in a first protocol to identify participants in a media session; examining a plurality of second requests in a second protocol to determine media characteristics associated with the participants; and grouping the participants into different groups based, at least in part, on the media characteristics, wherein at least some of the participants associated with substantially identical media characteristics are grouped together.

20 Claims, 5 Drawing Sheets

REDUCING REAL TIME MEDIA TRAFFIC IN A NETWORK ENVIRONMENT

TECHNICAL FIELD

This disclosure relates in general to the field of communications and, more particularly, to reducing real time media traffic in a network environment.

BACKGROUND

Video services have become increasingly important in today's society. Enterprises of varying sizes and types can effectively collaborate through any number of video conferencing tools. Videoconferencing technology can allow enterprises to cut costs, while boosting productivity within their workforces. Video conference architectures can deliver real-time, face-to-face interactions between people using advanced visual, audio, and collaboration technologies. Each participant (or group of participants) in a video conference can operate from a designated location (or a specialized room) to "dial in" and subsequently communicate with other participants on one or more screens, as if all participants were in the same room. The ability to offer a personalized videoconference experience that adequately renders video information presents a significant challenge to network operators, system designers, and hardware developers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes examining a plurality of first requests in a first protocol to identify participants in a media session. In this context, the term 'examining' is inclusive of any activity associated with identifying, evaluating, assessing, estimating, determining, or otherwise processing the requests. The method can further include examining a plurality of second requests in a second protocol to determine media characteristics associated with the participants. The method can also include grouping the participants into different groups based, at least in part, on the media characteristics, where at least some of the participants associated with substantially identical media characteristics are grouped together. The term 'grouping' in this context includes any activity associated with categorizing, dividing, ordering, segmenting, organizing, assembling, collecting, gathering, or otherwise characterizing the participants.

The method further includes receiving media streams in a third protocol, determining media characteristics associated with the media streams, and matching the media streams to the groups based at least on the media characteristics. In this context, the term "media stream" refers to any set (or combination) of media (e.g., video, audio, text, etc.) data delivered substantially continuously from a source to one or more recipients. The method can further include forking the plurality of media streams to each participant, so that each participant receives a forked media stream having media characteristics associated with the participant, and delivering the forked media streams to respective participants.

EXAMPLE EMBODIMENTS

Figure 1:
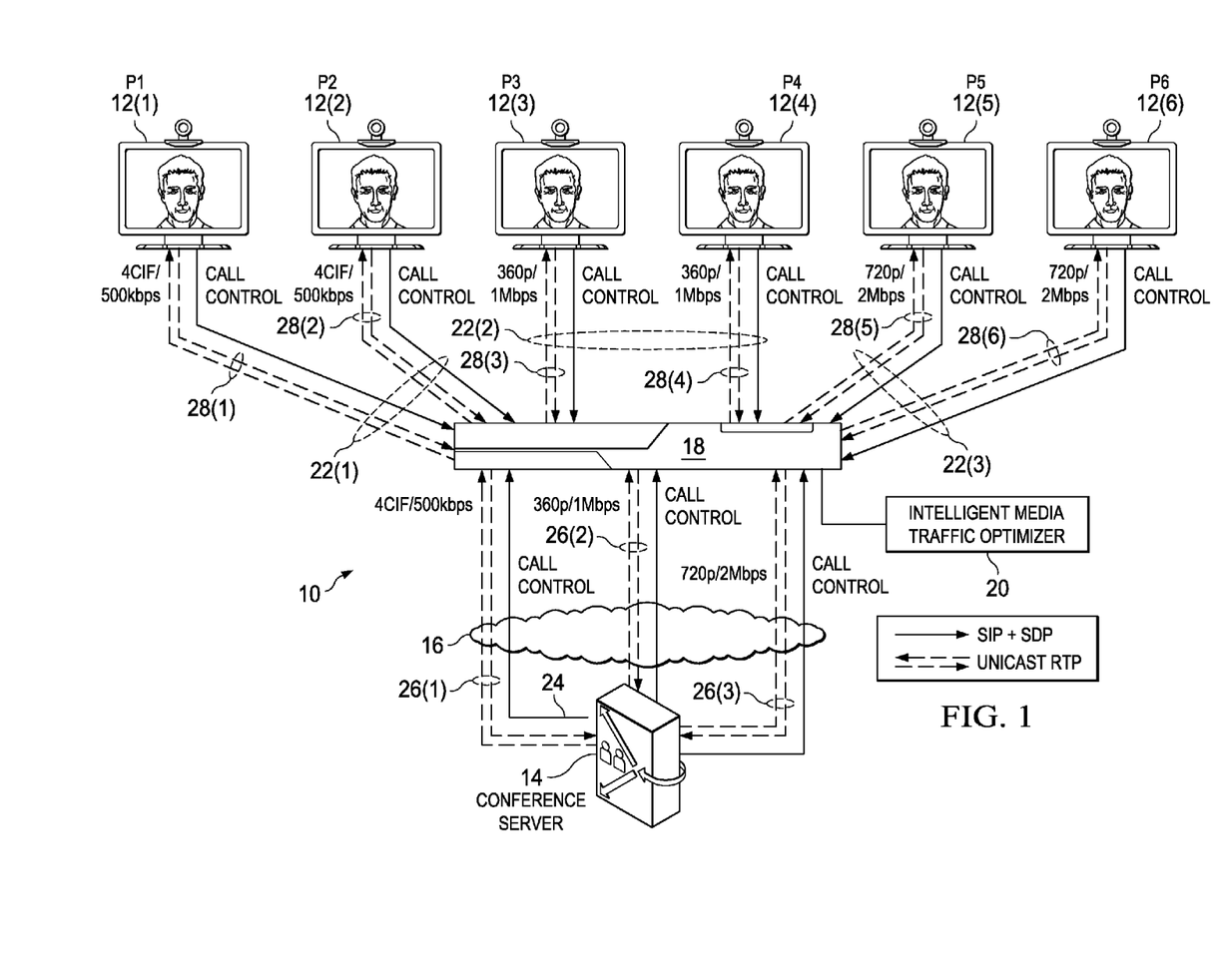
FIG. 1 is a simplified block diagram illustrating a communication system for reducing real time media traffic in a network environment.

Turning to FIG. 1, FIG. 1 is a simplified block diagram illustrating an embodiment of a communication system 10 for reducing real time media traffic in a network environment. Communication system 10 includes a network comprising participants 12(1)-12(6) communicating substantially simultaneously with a conference server 14 over a network 16. Each participant can be consuming the same (or similar) media content from conference server 14 in a media session such as a conference (e.g., where the media session involves a set of two or more participants, the media session includes a set of multimedia senders and receivers, and the media streams flow from senders to receivers). As used herein, the term "participant" includes any computing device that can be connected to a network and that can communicate in a particular media session. Examples of participants include (but are not limited to) servers, laptops, desktop computers, smart-phones, endpoints of various kinds, etc. A multi-point control unit (MCU) 18 including an intelligent media traffic optimizer (IMTO) 20 may be located between participants 12(1)-12(6) and conference server 14 to facilitate reducing real time media traffic in network 16.

In various embodiments, one or more participants 12(1)-12(6) may be grouped into one or more groups 22(1)-22(3) based on, for example, respective media characteristics (among other parameters). Participants 12(1)-12(6) may negotiate the media characteristics over call control 24, using any suitable protocol (e.g., Session Initiation Protocol (SIP) and/or Session Description Protocol (SDP)) and receive media streams 26(1)-26(3) having the media characteristics from conference server 14 in any other suitable protocol (e.g., Real-time Transport Protocol (RTP)).

As used herein, the term "media characteristics" includes any information associated with media streams, including (but not limited to) information such as codec information (e.g., H.263, H264, VP8, etc.), media type (e.g., video, audio, etc), transport protocol, such as RTP, User Datagram Protocol/Internet Protocol (UDP/IP), etc., media format (e.g., encrypted), media bandwidth, etc. For example, a common set of media characteristics may be negotiated between two communicating devices using SIP and SDP protocols, with one device offering a set of capabilities to which the other device answers, thus converging on the set of media characteristics that are compatible with both devices.

In an example embodiment, participants 12(1) and 12(2) in group 22(1) may accept unicast media streams at 4CIF/500 kbps; participants 12(3) and 12(4) in group 22(2) may accept unicast media streams at 360p/1 Mbps; and participants 12(5) and 12(6) in group 22(3) may accept unicast media streams at 720p/2 Mbps. The media characteristics may be negotiated through call control 24 between the network elements (e.g., participants 12(1)-12(6) and MCU 18) based on a suitable protocol, such as SIP and SDP. Media may be communicated through media stream 26 between the network elements (e.g., participants 12(1)-12(6) and conference server 14) based on a suitable protocol such as RTP.

MCU 18 and IMTO 20 are network elements configured to perform many of the activities discussed herein. "Network elements" as used herein can include computers, network appliances, servers, routers, switches, gateways, bridges, load balancers, firewalls, processors, modules, endpoint devices, client devices, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In some embodiments, IMTO 20 can facilitate logical grouping of participants 12(1)-12(6) into groups 22(1)-22(3), based at least on three protocols: a first protocol (e.g., SIP) for session initiation, a second protocol (e.g., SDP) for streaming media parameters, and a third protocol (RTP) for delivery of media streams 26. Embodiments of communication system 10 can reduce real-time unicast media traffic in the conference by learning the identity of participants 12(1)-12(6) that are substantially simultaneously participating in the conference, learning their respective media characteristics (e.g., media capabilities), and eliminating duplication of unicast media streams 26 by grouping together participants having similar media characteristics.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a typical video conferencing application, participants communicate in a unicast communication session. The participants in the conference are often co-located within a network partition, such as a logical subnet, or a physical wireless access point. Each participant first joins the conference using SIP and negotiates media characteristics such as bandwidth, audio and video codecs, etc. using SDP. In some scenarios, a centralized conference server (commonly referred to as a conference focus) may facilitate communication between the participants. Each participant maintains a unicast session with conference server. Typically, RTP is used by each participant to send and receive real-time media, including but not limited to, audio and video. Each participant typically sends real-time unicast media streams representing the participant's contribution to the conference, and receives real-time unicast media streams representative of the conference as a whole. The amount of network traffic is generally proportional to the number of participants, and much of the traffic is essentially duplicated as most participants receive similar representations of the conference.

In some centralized conferencing deployments, the MCU negotiates media characteristics with each participant within the conference, and sends media streams to each participant via one or more unicast RTP sessions without attempting to avoid or limit duplication of the media streams. For example purposes, assume that the conference has the following types of participants based on media consumption, namely, media stream 1 at 2 Mbps (720p@30 fps), media stream 2 at 1 Mbps (360p@30 fps), and media stream 3 at 500 kbps (4CIF@15 fps). In the traditional deployment model, the total bandwidth consumption on a wide area network (WAN) from the MCU to the participants would be a sum of bandwidth used by the three media streams. Assuming the media streams 1, 2 and 3 are to be delivered to 10, 15 and 20 participants respectively, the total network bandwidth consumption for each media stream would be: bandwidth for media stream 1 (720p stream @2 Mbps)=10×2=20 Mbps; bandwidth for media stream 2 (360p stream @1 Mbps)=15×1=15 Mbps; and bandwidth for media stream 3 (4CIF @500 kbps)=20×0.5=10 Mbps, resulting in a total bandwidth of 20+15+10=45 Mbps. Much of the bandwidth would be used up by duplicate media streams, having same (or substantially similar) media characteristics.

A CDN (Content Delivery Network) can deliver multimedia content over the Internet, but it does not currently optimize the delivery based on the logical grouping of the participants in the conference, for example, by analyzing recipient media characteristics to support delivery of low latency, real time audio/video conferencing services. The CDN serves content to end-users with high availability and high performance. CDN nodes are usually deployed in multiple locations, often over multiple backbones. The number of nodes and servers making up the typical CDN varies, depending on the architecture, some reaching thousands of nodes with tens of thousands of servers on many remote points of presence (PoPs). CDNs augment end-to-end transport network by distributing a variety of intelligent applications employing techniques designed to optimize content delivery. Such applications include, for example, web caching, server load balancing, request routing, etc. However, they do not involve grouping recipients based on the media characteristics or other parameters.

Multicast is a known technique to reduce the amount of replicated traffic sent over a network (e.g., Over-The-Top entertainment video networks). Such networks have multicast sources producing media streams. The multicast sources typically produce media streams on a multicast address or port according to its capability and potential recipients interested in receiving the multicast streams typically join (or leave) the associated multicast group(s) and receive the corresponding media streams. The multicast sources generally do not have knowledge of the multicast receivers joining or leaving the groups. In addition, there is no negotiation of media characteristics (e.g., bandwidth, audio/video codec, resolution, etc.) between the receiver(s) and the multicast source. Typical multicast networks also require an Internet Group Management Protocol (IGMP) aware router.

Communication system 10 provides a system and method for reducing real time media traffic in a network environment. Embodiments of communication system 10 can learn logical groupings of participants 12(1)-12(6) and the corresponding media characteristics of real-time unicast media streams 26, and leverage the accumulated knowledge to reduce duplication of media streams 26 within the conference, thereby reducing the real time media traffic over the network.

Embodiments of communication system 10 can examine requests in a first protocol (e.g., SIP) to identify participants 12(1)-12(6) in a media session, examine requests in a second protocol (e.g., SDP) to determine media characteristics associated with participants 12(1)-12(6), group participants 12(1)-12(6) into different groups 22(1)-22(3) based on the media characteristics, with participants having substantially identical media characteristics being grouped together (e.g., into groups 22(1)-22(3)). The requests in the first protocol and requests in the second protocol may be included in call control 24. Note that the numbers of participants and groups, and media characteristics illustrated in the FIGURE are merely for example purposes, and are not intended to be limitations. Virtually any number of participants and groups, and media characteristics may be included within the broad scope of the embodiments of communication system 10.

In various embodiments, IMTO 20 may receiving media streams 26(1)-26(3) in a third protocol (e.g., RTP) from a sender (e.g., conference server 14) in the media session, determine media characteristics associated with media streams 26(1)-26(3), and match media streams 26(1)-26(3) to different groups 22(1)-22(3) based on the media characteristics. For example, media stream 26(1) may be matched to group 22(1); media stream 26(2) may be matched to group 22(2); and media stream 26(3) may be matched to group 22(3). IMTO 20 may fork (e.g., divide, branch, separate, split, duplicate) media streams 26(1)-26(3) to each participant 12(1)-12(6) in corresponding groups 22(1)-22(3), so that each participant 12(1)-12(6) can receive respective forked media streams 28(1)-28(6) having media characteristics associated therewith. Further, IMTO 20 can deliver forked media streams 28(1)-28(6) to respective participants 12(1)-12(6). Thus, participant 12(1) may receive forked media stream 28(1); participant 12(2) may receive forked media stream 28(2); participant 12(3) may receive forked media stream 28(3); and so on. Thus, duplication of media streams 26(1)-26(3) may be avoided between MCU 18 and conference server 14 in the network, and each media stream 26(1)-26(3) of the media session sent between MCU 18 and conference server 14 may have distinct media characteristics.

In various embodiments, IMTO 20 may be located at a local area network (LAN) comprising participants 12(1)-12(6), and may communicate with conference server 14 over a wide area network (WAN), such as the Internet. According to the example embodiment illustrated in FIG. 1, MCU 18 may send one unicast stream for each distinct media characteristic thereby consuming much lower bandwidth of 3.5 Mbps on the WAN, compared to 45 Mbps (which would be the case if duplicate media streams were to be sent from conference server 14 to each participant 12(1)-12(6) directly). In the specific example, the network consumption on the WAN is reduced to less than 10%. If most of the network traffic is 720p (or higher), the amount of WAN bandwidth savings can be substantial.

IMTO 20 may receive substantially all media characteristics from participants 12(1)-12(6), and function as a media replicator and forwarder to participants 12(1)-12(6) within the LAN. IMTO 20 can optimize the number of unique unicast streams requested from conference server 14. IMTO 20 can identify participants 12(1)-12(6) that are part of the same media session (e.g., conference). IMTO 20 can also determine each participant's media characteristics. By correlating the information, IMTO 20 may decide to request from conference server 14 merely one copy (as an example) of each real-time unicast stream with distinct media characteristics that can accommodate all participants' media characteristics, thereby significantly reducing bandwidth requirement on the WAN link between the conference server 14 and IMTO 20. Note that the operations described herein can include a network architecture wherein participants 12(1)-12(6) are in a peer-to-peer network mesh, rather than communicating with a centralized conference server 14.

Embodiments of communication system 10 can be applied to interactive video conference (e.g., Cisco® Telepresence meeting), which is unicast in nature. Embodiments of communication system 10 can use at least three different protocols (e.g., SIP, SDP, RTP) to derive logical groupings 22(1)-22(3) of participants 12(1)-12(6). Embodiments of communication system 10 may request fewer media streams 26(1)-26(3) from a sender (e.g., conference server 14), thereby reducing traffic on the network between IMTO 20 and the sender (e.g., conference server 14). Embodiments of communication system 10 can locally fork media streams 26(1)-26(3) into media streams 28(1)-28(6) to send to each conference participant 12(1)-12(6). Embodiments of communication system 10 can also drop or request new media streams from conference server 14 based on changes in network conditions (e.g., bandwidth, etc.) ad indicated by conference server 24 or participants 12(1)-12(6).

In various embodiments, IMTO 20 may requesting as many media streams from conference server 14 as a number of groups 22(1)-22(3) derived from the media characteristics of participants 12(1)-12(6). In some embodiments, participants 12(1)-12(6) and/or conference server 14 may be unaware of the IMTO 20's existence in the network. Participants 12(1)-12(6) and server 14 continue to maintain unicast sessions, and consequently, the grouping can be transparent to participants 12(1)-12(6) and conference server 14. By requesting fewer media streams 12(1)-12(3) from conference server 14, and forking it locally to each participant 12(1)-12(6), IMTO 20 can reduces duplicate media traffic over the network.

In some embodiments, as network conditions change, conference server 14 and/or participants 12(1)-12(6) can indicate changes in network conditions (e.g., bandwidth, codec etc.) The changes may result in one or more participants 12(1)-12(6) having to receive media streams with different media characteristics (e.g. different resolution and frame rate). IMTO 20 may substantially constantly (e.g., dynamically) adjust to these changes in media characteristics and update logical groupings appropriately. Updates in logical groupings can result in adding or dropping media streams received from conference server 14. Thus, media traffic over the network can be substantially constantly optimized in real time.

In various embodiments, IMTO 20 can examine SIP requests and determine participants 12(1)-12(6), for example, by reading a value of field ConferenceID in the SIP request. From SDP requests, IMTO 20 can determine media characteristics, such as negotiated codec, bandwidth, frame rate, resolution etc. IMTP 20 may examine respective values of RTP fields, such as source IP address (Src IP), source port (Src Port), destination IP address (Dst IP), destination port (Dst Port) and dynamic media stream characteristics like actual resolution and frame rate. IMTO 20 may use substantially all the collected and information to derive logical grouping of participants 12(1)-12(6). Conference server 14 and IMTO 20 may be substantially always aware of participants 12(1)-12(6) and their respective media characteristics. Embodiments of communication system 10 can significantly reduce real-time unicast media traffic in an enterprise video conferencing application by learning that multiple participants are part of the same conference, then learning their media characteristics, and when these media characteristics are similar, eliminating duplication of unicast media streams.

According to some embodiments, for example, depending on the mode of operation of IMTO 20, the media in the direction from participants 12(1)-12(6) towards conference server 14 may or may not be processed (e.g., optimized) in a manner similar to processing of the media going from conference server 14 towards participants 12(1)-12(6). For example, IMTO 20 may pass all media from substantially all participants 12(1)-12(6) to conference server 14, or it may aggregate or filter the media (e.g. the loudest speaker(s) audio/video only) based on its mode of operation (or other suitable parameters).

Turning to the infrastructure of communication system 10, the network topology can include any number of servers, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment may be configured over a physical infrastructure that may include one or more networks and, further, may be configured in any form including, but not limited to, LANs, wireless local area networks (WLANs), virtual local area networks (VLANs), metropolitan area networks (MANs), WANs, virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). The network topology may represent any type of network, including Internet, enterprise networks, cloud networks, etc.

MCU 18 may include any suitable device that can bridge videoconferencing (or other multi-media) connections. In some embodiments, MCU 18 may comprise an endpoint in a LAN that provides capability for several terminals and/or gateways to participate in a media session. MCU 18 may include a multipoint controller and one or more processors. MCU 18 may include capabilities to support (e.g., forward, generate, etc.) media streams of various media characteristics, including resolution and bitrate. For example, MCU 18 can include 10×720p30 high definition (HD) ports, 5×1080p30 or 720p60 full HD ports; 20×w448p30 SD ports; 24×w360p30 nHD ports; capable of supporting up to 10 voice participants, with firewall and other network service capabilities. In some embodiments, MCU 18 may be configurable by a network administrator (or other user), who can configure the maximum number of participants in any media session, the best and worst media bit rates and resolutions, etc. In some embodiments, MCU 18 may be included as a stand-alone network element; in other embodiments, the functionalities of MCU 18 may be integrated into other network elements, such as a firewall, gateway, etc. based on particular needs.

In various embodiments, IMTO 20 may be provisioned in any suitable network element at an edge of a LAN (e.g., interfacing with a WAN), or other suitable location in the network. For example, IMTO 20 may be provisioned in a switch, router, firewall, server load balancer, or other suitable network element. In some embodiments, the network may be provisioned with more than one instance of IMTO 20, for example, distributed across various network elements in the network. In some embodiments, IMTO 20 may receive media streams from a plurality of senders (e.g., multiple conference servers, or participants) and fork them suitably to participants based on the media characteristics.

In various embodiments, IMTO 20 may be an instance of an application executing on MCU 18 (or other suitable network element). In other embodiments, certain portions of IMTO 20 may be implemented in hardware and certain other portions may be implemented in software. In yet other embodiments, IMTO 20 may be implemented substantially completely in hardware, for example, in a stand-alone network appliance that can be plugged into the network in between receivers and senders in the media session.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of participants, conference servers, MCUs, and IMTOs within the broad scope of the present disclosure.

Figure 2:
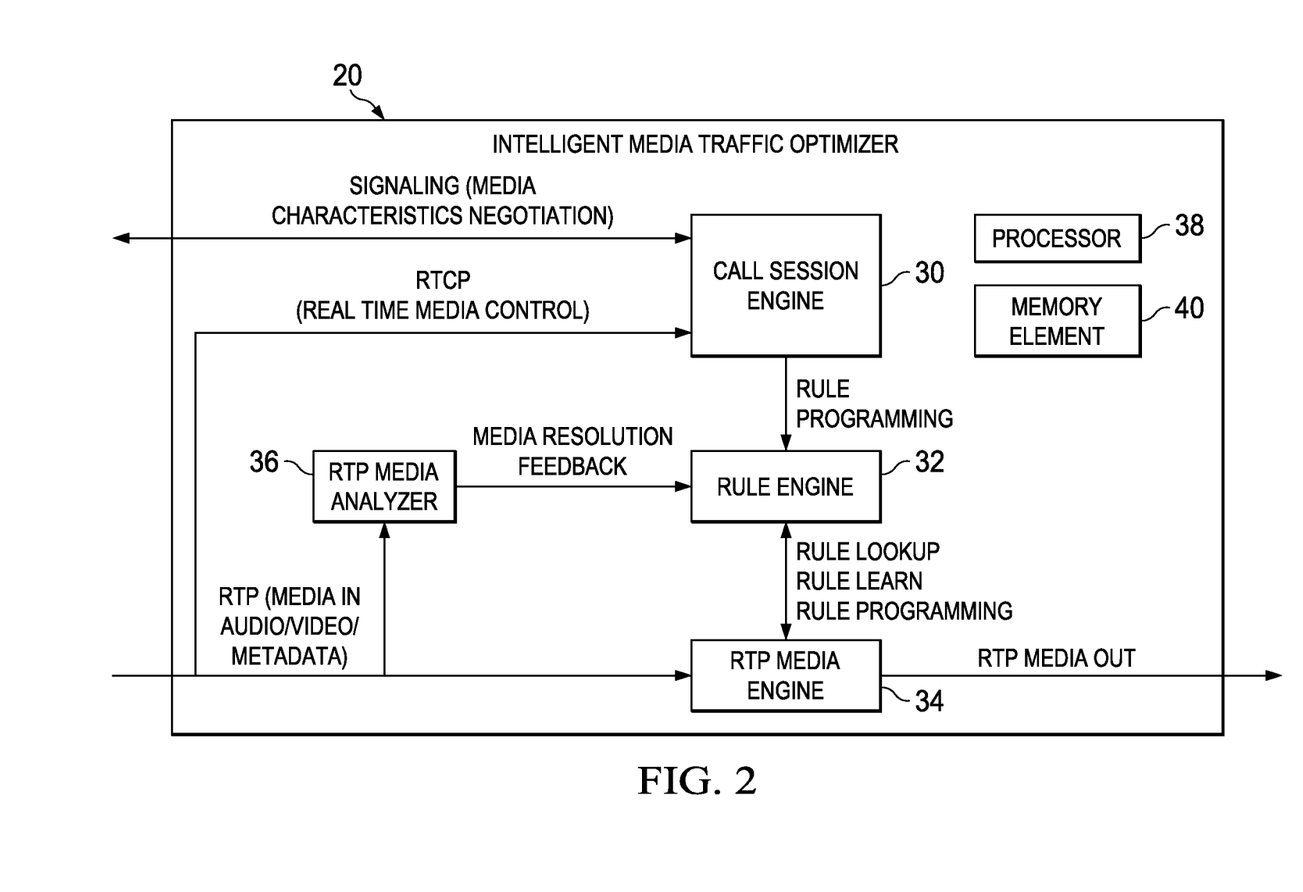
FIG. 2 is a simplified block diagram illustrating example details of the communication system in accordance with one embodiment.

Turning to FIG. 2, FIG. 2 is a simplified block diagram illustrating example details of an embodiment of communication system 10. Example IMTO 20 includes a call session engine 30, a rule engine 32, an RTP media engine 34, an RTP media analyzer 36, a processor 38, and a memory element 40. Call session engine 30 can work as a SIP back-to-back user agent (B2BUA) between participants 12(1)-12(6) and conference server 14. Call session engine 30 can examine each SIP request (from each participant 12(1)-12(6)), noting values with specific SIP headers (e.g. request uniform resource indicator (URI) indicating multiple participants joining the same conference number). Call session engine 30 can also look at SDP requests to determine if there is a common set of media stream(s) being negotiated. If a potential/candidate grouping is found, call session engine 30 may group corresponding participants 12(1)-12(6) together.

RTP media engine 34 may process incoming unicast RTP packets (e.g., in media streams 26(1)-26(3) from conference server 14) and optimize their delivery to participants 12(1)-12(6). RTP media engine 34 may receive participants' grouping details from call session engine 30, and extract values of appropriate fields (e.g., Src IP, Src Port, Dst IP, and Dst Port) for identifying the media sessions associated with media streams 26(1)-26(3). RTP media engine 34 can also extract dynamic media stream characteristics like resolution and frame rate from media streams 26(1)-26(3). RTP media engine 34 may input the collected information into rule engine 32 to perform a lookup. The result of the lookup can comprise a set of participants (e.g., 12(1)-12(2)) to which the media stream(s) (e.g., 26(1)) are to be delivered.

RTP media analyzer 36 may receive and decode each incoming media stream 26(1)-26(3) and determine their respective media characteristics, such as frame rate and resolution. RTP media analyzer 36 may also determine if there is a media loss and a new Instant Decoder Refresh (IDR) is requested from MCU 18. RTP media analyzer 36 may squelch (e.g., stifle, terminate, censor, end, etc.) any redundant IDR requests from participants 12(1)-12(6).

Rule engine 32 may substantially continuously collect media characteristics from RTP media engine 34 and combine it with participant grouping information from call session engine 30 as participants 12(1)-12(6) join and drop out of the media session. From data received from call session engine 30 and RTP media engine 34, rule engine 32 may determine participants (e.g., 12(1)-12(2); 12(3)-12(4); 12(5)-12(6)) sharing similar media characteristics within corresponding groups (e.g., 22(1); 22(2); 22(3)) and are candidates to receive duplicate media streams 28(1)-28(6) from conference server 14. Once rule engine 32 learns that a group of media streams has similar characteristics, it informs call session engine 30 and RTP media engine 34. Call session engine 30 may modify the SIP/SDP session to avoid receiving duplicate media streams from conference server 14.

Rule engine 32, which groups participants (e.g., 12(1)-12(6)) may examine at least three different protocols (e.g., SIP, SDP, RTP) to derive grouping information. For example, from SIP signaling, rule engine 32 may examine field ConferenceID to find participants (e.g., 12(1)-12(6)) in the same media session; from SDP, rule engine 32 may examine media characteristics, such as codec, bandwidth, frame rate, resolution etc.; from RTP, rule engine 32 may examine fields such as Src IP, Src Port, Dst IP and Dst Port and dynamic media stream characteristics like actual resolution and frame rate. An RTP Media Forking Engine in RTP media engine 34 may receive encoded streams and media grouping information from rule engine 32 and fork media streams (e.g., 26(1)) to each participant (e.g., 12(1)-12(2)) identified as being within the group (e.g., 22(1)).

Figure 3:
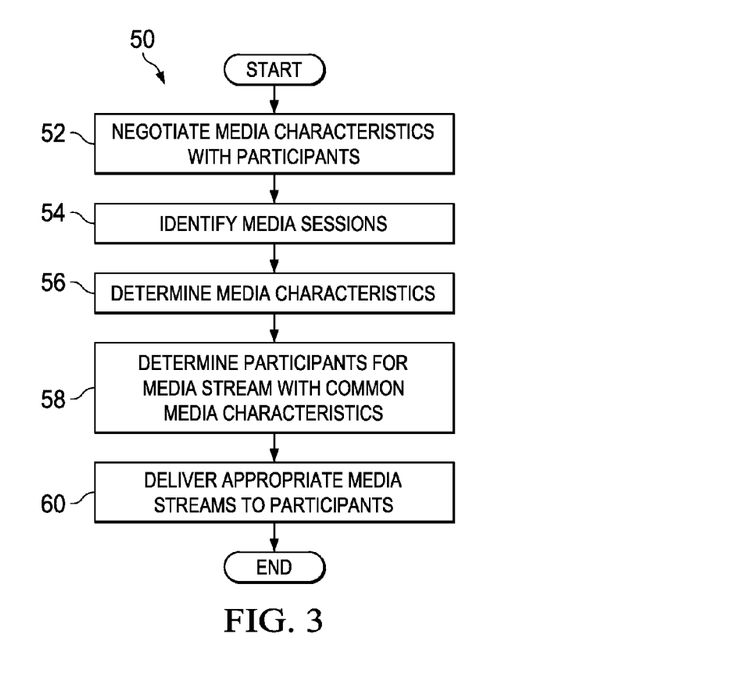
FIG. 3 is a simplified flow diagram illustrating example operational activities that may be associated with embodiments of the communication system.

Turning to FIG. 3, FIG. 3 is a simplified flow diagram illustrating example operations 50 that may be associated with embodiments of communication system 10. At 52, IMTO 20 may negotiate (e.g., determine from requests and other communication) media characteristics with participants (e.g., 12(1)-12(6)). At 54, IMTO 20 may identify (e.g., based on the value of ConferenceID field in SIP requests) the media sessions in which participants (e.g., 12(1)-12(6)) are communicating. At 56, IMTO 20 may determine the media characteristics of respective participants (e.g., 12(1)-12(6)) and media streams (e.g., 26(1)-26(3)). At 58, IMTO 20 may determine participants for media streams with common media characteristics. For example, IMTO 20 may determine that participants 12(1) and 12(2) should receive media stream 26(1). At 60, IMTO 20 may deliver appropriate media streams (e.g., 28(1)-28(6)) to participants (e.g., 12(1)-12(6)).

Figure 4:
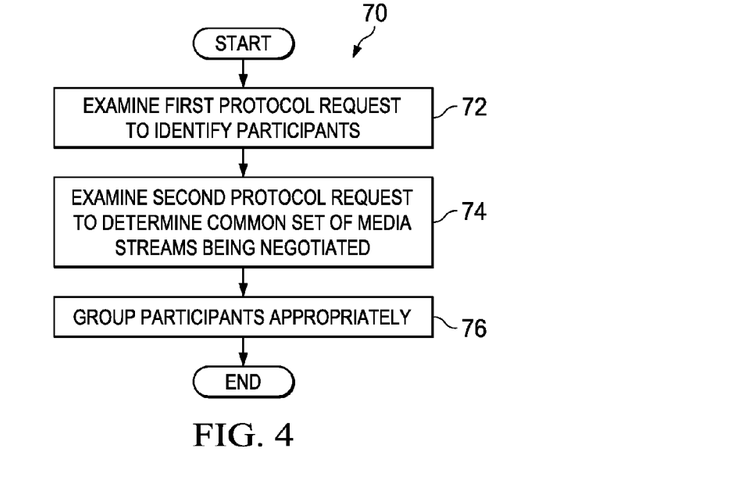
FIG. 4 is a simplified flow diagram illustrating other example operational activities that may be associated with embodiments of the communication system.

Turning to FIG. 4, FIG. 4 is a simplified flow diagram illustrating example operations 70 that may be associated with call session engine 30 according to embodiments of communication system 10. At 72, call session engine 30 may examine a first protocol request (e.g., SIP request) to identify participants (e.g., 12(1)-12(6)). At 74, call session engine may examine a second protocol request (e.g., SDP request) to determine a common set of media streams being negotiated between receivers (e.g., participants 12(1)-12(6)) and senders (e.g., conference server 14). At 76, call session engine 30 may group participants (e.g., 12(1)-12(6)) appropriately (e.g., participants capable of handling substantially identical media characteristics grouped together).

Figure 5:
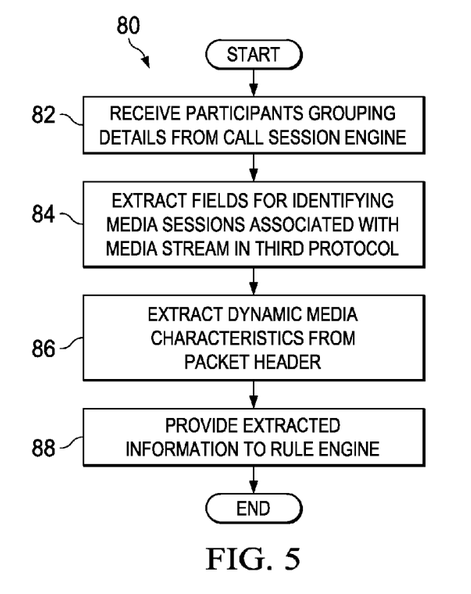
FIG. 5 is a simplified flow diagram illustrating yet other example operational activities that may be associated with embodiments of the communication system.

Turning to FIG. 5, FIG. 5 is a simplified flow diagram illustrating example operations 80 that may be associated with RTP media engine 34 according to embodiments of communication system 10. At 82, RTP media engine 34 may receive participants' grouping details from call session engine 30. At 84, RTP media engine 34 may extract fields for identifying media sessions associated with the media streams in the third protocol (e.g., RTP). At 86, RTP media engine 34 may extract dynamic media characteristics from a header of a packet of the media stream. At 88, the extracted information may be provided to rule engine 32.

Figure 6:
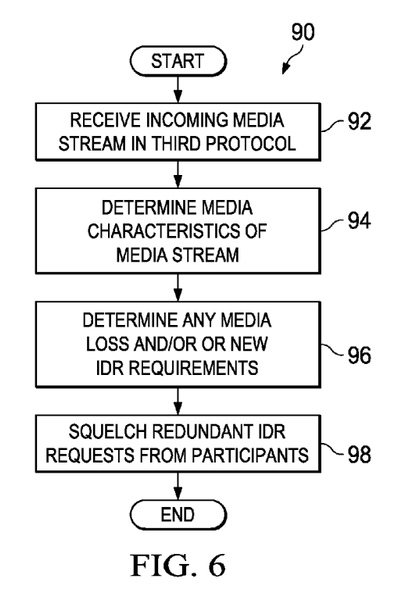
FIG. 6 is a simplified flow diagram illustrating yet other example operational activities that may be associated with embodiments of communication system.

Turning to FIG. 6, FIG. 6 is a simplified flow diagram illustrating example operations 90 that may be associated with RTP media analyzer 36 according to embodiments of communication system 10. At 92, RTP media analyzer 36 may receive incoming media stream(s) (e.g., 26(1)-26(3)) in the third protocol (e.g., RTP). At 94, RTP media analyzer may determine the media characteristics (e.g., resolution, bandwidth, etc.) of the media streams (e.g., 26(1)-26(3)). At 96, RTP media analyzer 36 may determine any media loss and/or new IDR requirements. At 98, RTP media analyzer 36 may squelch redundant IDR requests from participants (e.g., 12(1)-12(6)).

Figure 7:
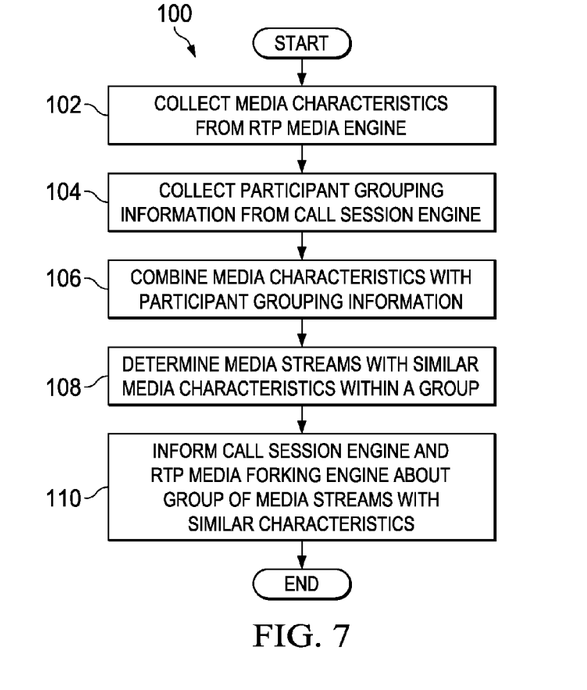
FIG. 7 is a simplified flow diagram illustrating yet other example operational activities that may be associated with embodiments of communication system.

Turning to FIG. 7, FIG. 7 is a simplified flow diagram illustrating example operations 100 that may be associated with rule engine 32 according to embodiments of communication system 10. At 102, media characteristics may be collected from RTP media engine 34. At 104, participant grouping information from call session engine 30. At 106, media characteristics may be combined with participant grouping information. At 108, media streams (e.g., 28(1), 28(2); 28(3), 28(4); 28(5); 28(6)) with similar media characteristics within a group may be determined. For example, the media streams (e.g., 26(1)-26(3)) from conference server 14 may be matched to the different groups (e.g., 22(1)-22(3)) based at least on the media characteristics. At 110, rule engine 32 may inform call session engine 30 and RTP media forking engine (within RTP media engine 34) about groups of media streams with similar media characteristics.

Figure 8:
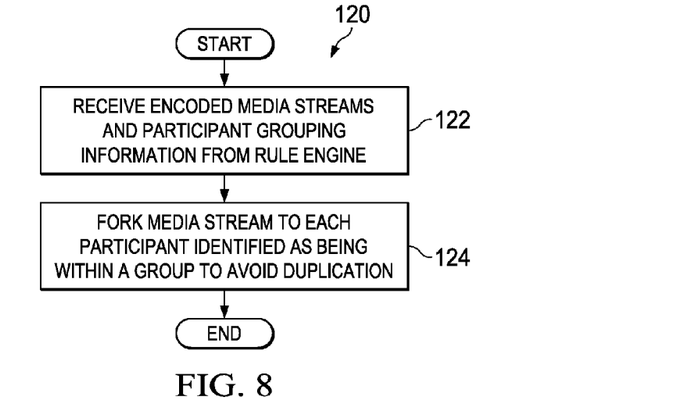
FIG. 8 is a simplified flow diagram illustrating yet other example operational activities that may be associated with embodiments of communication system.

Turning to FIG. 8, FIG. 8 is a simplified flow diagram illustrating example operations 120 that may be associated with RTP media forking engine within RTP media engine 34 according to embodiments of communication system 10. At 122, encoded media streams (e.g., 26(1)-26(3)) and participant grouping information from rule engine 32 may be received. At 124, media streams (e.g., 26(1)-26(3)) may be forked (e.g., into media streams 28(1)-28(2); 28(3)-28(4); 28(5)-28(6)) to each participant (e.g., 12(1)-12(6)) identified as being within a group to avoid duplication.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, IMTO 20. In some embodiments, one or more of these features may be implemented in hardware, provided external to these elements, or consolidated in any appropriate manner to achieve the intended functionality. The various network elements (e.g., MCU 18, IMTO 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, IMTO 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 40) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 38) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

What is claimed is:

1. A method, comprising:
examining, by a multi-control unit (MCU), a plurality of first requests in a first protocol to identify participants in a media session in a network environment, wherein the participants comprise computing devices connected to the network;
examining a plurality of second requests in a second protocol to determine media characteristics negotiated by the participants;
grouping the participants into different groups based, at least in part, on the negotiated media characteristics, wherein at least some of the participants associated with identical media characteristics are grouped together;
requesting a conference server in the network to transmit a single copy of each unicast media stream having distinct media characteristics;
examining a plurality of incoming unicast media streams from the conference server, the plurality of incoming unicast media streams comprising one copy each of separate unicast media streams having distinct media characteristics;
matching the distinct media characteristics of at least one of the unicast media streams to the negotiated media characteristics of one of the groups; and
forking the at least one of the unicast media streams into duplicate media streams conforming to the participants in the matched group.

2. The method of claim 1, wherein the first protocol comprises Session Initiation Protocol (SIP), and the second protocol comprises Session Description Protocol (SDP).

3. The method of claim 1, wherein the first requests in the first protocol and the second requests in the second protocol are received from the participants.

4. The method of claim 1, further comprising:
identifying, based at least in part on one or more identifiers, one or more media sessions in which at least one of the participants is communicating.

5. The method of claim 1, wherein the unicast media streams are received in a third protocol from the conference server, the method further comprising:
determining the distinct media characteristics associated with the incoming unicast media streams.

6. The method of claim 5, wherein the third protocol comprises Real-time Transport Protocol (RTP).

7. The method of claim 5, further comprising combining the distinct media characteristics with participant grouping information.

8. The method of claim 5, wherein the determining the distinct media characteristics associated with the media streams comprises:
extracting fields for identifying the media session associated with the media streams; and
extracting corresponding media characteristics from a header of at least one packet of each of the media streams.

9. The method of claim 1,
wherein each participant receives a forked media stream having media characteristics associated with the participant, the method further comprising
delivering the forked media streams to respective participants.

10. The method of claim 1, further comprising:
squelching redundant Instant Decoder Refresh (IDR) requests from the participants.

11. One or more non-transitory tangible media encoding logic that includes instructions for execution, which when executed by a processor of a MCU, is operable to perform operations comprising:
examining a plurality of first requests in a first protocol to identify participants in a media session in a network environment, wherein the participants comprise computing devices connected to the network;
examining a plurality of second requests in a second protocol to determine media characteristics negotiated by the participants;
grouping the participants into different groups based, at least in part, on the negotiated media characteristics, wherein at least some of the participants associated with identical media characteristics are grouped together;
requesting a conference server in the network to transmit a single copy of each unicast media stream having distinct media characteristics;
examining a plurality of incoming unicast media streams from the conference server, the plurality of incoming unicast media streams comprising one copy each of separate unicast media streams having distinct media characteristics;
matching the distinct media characteristics of at least one of the unicast media streams to the negotiated media characteristics of one of the groups; and
forking the at least one of the unicast media streams into duplicate media streams conforming to the participants in the matched group.

12. The media of claim 11, wherein the first protocol comprises SIP, and the second protocol comprises SDP.

13. The media of claim 11, wherein the unicast media streams are received in a third protocol from the conference server, wherein the operations further comprise:
determining the distinct media characteristics associated with the incoming unicast media streams.

14. The media of claim 13, wherein the third protocol comprises RTP.

15. The media of claim 11,
wherein each participant receives a forked media stream having media characteristics associated with the participant, the operations further comprising:
delivering the forked media streams to respective participants.

16. An apparatus, comprising:
a videoconferencing bridge with capabilities for several terminals and gateways to participate in a media session;
a multipoint controller;
a memory element for storing data; and
a processor that executes instructions associated with the data, wherein the processor and the memory element cooperate such that the apparatus is configured for:
examining a plurality of first requests in a first protocol to identify participants in a media session in a network environment, wherein the participants comprise computing devices connected to the network;
examining a plurality of second requests in a second protocol to determine media characteristics negotiated by the participants;
grouping the participants into different groups based, at least in part, on the negotiated media characteristics, wherein at least some of the participants associated with identical media characteristics are grouped together;

requesting a conference server in the network to transmit a single copy of each unicast media stream having distinct media characteristics;

examining a plurality of incoming unicast media streams from the conference server, the plurality of incoming unicast media streams comprising one copy each of separate unicast media streams having distinct media characteristics;

matching the distinct media characteristics of at least one of the unicast media streams to the negotiated media characteristics of one of the groups; and forking the at least one of the unicast media streams into duplicate media streams conforming to the participants in the matched group.

17. The apparatus of claim 16, wherein the first protocol comprises SIP, and the second protocol comprises SDP.

18. The apparatus of claim 16, wherein the unicast media streams are received in a third protocol from the conference server, wherein the apparatus is further configured for:

determining the distinct media characteristics associated with the incoming unicast media streams.

19. The media of claim 18, wherein the third protocol comprises RTP.

20. The media of claim 16, wherein each participant receives a forked media stream having media characteristics associated with the participant, the apparatus being further configure for:

delivering the forked media streams to respective participants.

\* \* \* \* \*